(No Model.)
F. W. DICK & J. RILEY.
REGENERATIVE FURNACE FOR STEEL MAKING.
No. 328,389. Patented Oct. 13, 1885.
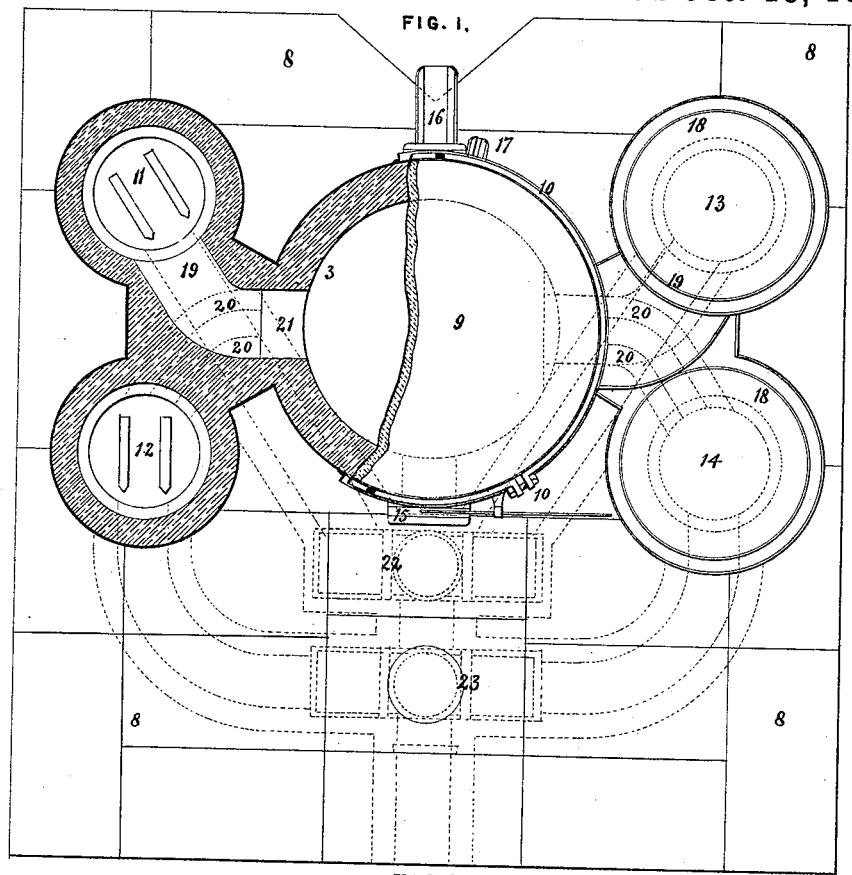
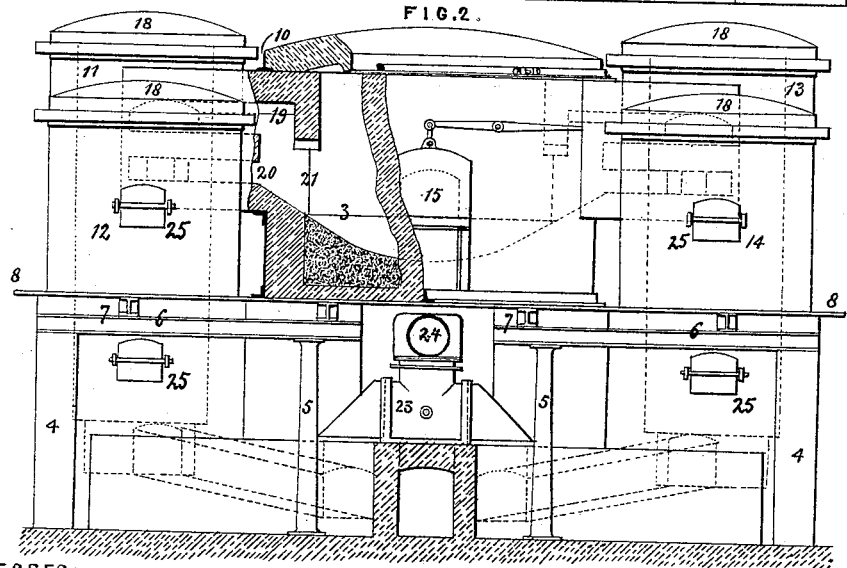
WITNESSES:
Harry Drury
John E. Parker
INVENTORS:
Frank W. Dick
and
James Riley
by their Attorneys
Howson and Sons

UNITED STATES PATENT OFFICE.

FRANK WESLEY DICK AND JAMES RILEY, OF NEAR GLASGOW, COUNTY OF LANARK, SCOTLAND.

REGENERATIVE FURNACE FOR STEEL-MAKING.

SPECIFICATION forming part of Letters Patent No. 328,389, dated October 13, 1885.

Application filed July 2, 1884. Serial No. 136,613. (No model.) Patented in England March 5, 1883, No. 1,157; in France June 27, 1884, No. 162,973; in Belgium June 28, 1884, No. 65,610, and in Germany July 5, 1884, No. 30,899.

*To all whom it may concern:*

Be it known that we, FRANK WESLEY DICK and JAMES RILEY, subjects of the Queen of Great Britain and Ireland, and residing near Glasgow, in the county of Lanark, Scotland, have invented an Improved Regenerative Furnace for Steel-Making and other Purposes, (for which we have obtained a British patent dated March 5, 1883, No. 1,157,) of which the following is a specification.

Our improved furnace is of the kind in which gaseous fuel is used, and in connection with which heat-regenerators are employed. The regenerative chambers are buildings detached from the main furnace-building, and at the sides of such main building.

In the accompanying drawings, Figure 1 is a sectional plan, and Fig. 2 is a sectional elevation, of a regenerative furnace as made with our improvements.

The main furnace 3 is of a circular form in plan, and is built upon a platform supported by walls 4 and pillars 5, and by girders 6 7, placed at right angles to each other and covered by iron or steel plates 8. The bed of the furnace 3 is formed in the usual way; but the roof 9 consists of a convex shell of fire-brick or silica-bricks built upon an iron or steel ring of inverted-T section and bound by an outer iron or steel ring, 10, and the roof rests on the top of the vertical cylindrical side wall of the furnace. There are four regenerative chambers, 11 12 13 14, which are arranged in two pairs with the furnace 3 between them, the two chambers 11 12 or 13 14 of a pair being near together, while the pairs are widely apart, so as to leave ample access to the front and back of the furnace, at which parts the usual working-door, 15, and tapping-spout 16 are placed. Near the main tapping-spout 16 there is a smaller one, 17, placed at a higher level, for running off slag from the surface of the molten steel.

The regenerative chambers 11 12 13 14 consist of vertical cylindrical iron or steel shells lined with fire-brick, and have their upper ends closed by covers 18, consisting of convex shells of fire-brick bound by iron or steel rings. Near their upper ends the regenerative chambers communicate with the furnace 3 by flues 19 20, arranged so that the air-flues 19 from the larger chambers 11 13, in which the air is heated, enter immediately above the gas-flues 20 from the smaller chambers 12 14, the air-flues 19 being directed downward into the throats or spaces 21, in which the gas and air mix and through which they enter the furnace 3. The flues or passages from the other or bottom ends of the regenerative chambers 11 12 13 14 are formed in brick-work upon which the chambers are supported, and are indicated by dotted lines in the drawings. These lower flues or passages are connected, as usual, to reversing-valves, the casings 22 23 of which are indicated by dotted lines in Fig. 1, while one, 23, is shown in elevation in Fig. 2. The air enters the open top of one, 22, of these casings, while the gas is led to the top of the other, 23, by a pipe or duct, 24. Each regenerative chamber is provided with two doors, 25, to give access for arranging or removing the brick checker-work inside. The checker-work is not shown in the figures, but is of the ordinary kind.

We are aware that it is not new to build the regenerators at the sides of the furnace instead of below; but so far as we are aware the construction above described is new—that is, the construction of the four separate regenerative structures arranged in two pairs with the furnace between them and connected at their upper ends by flues, the gas-regenerators being separate from the air-regenerators, so that there can be no leakage, and in consequence the regenerators will last much longer.

We are also aware that it is not new to provide furnaces with iron-clad removable roofs, and therefore only wish to claim the specific combination set forth.

We therefore claim as our invention—

1. In a regenerative steel-making furnace, a working-chamber having a fixed hearth and a circular or oval form in section, separate air and gas inlets and outlets at diametrically-opposite parts and communicating by short horizontal flues with the regenerative chambers, in combination with separate or distinct regenerative chambers for air and gas detached from the working-chamber and from each other, and constructed of brick-work and inclosed in metal shells, all substantially as set forth.

2. The combination of the working-chamber of a steel-making furnace with both air and gas regenerators separate from each other and from the working-chamber, the said regenerators being constructed of brick-work inclosed in metal shells of cylindrical or similar form and having separable or removable covers, substantially as set forth.

In testimony whereof we have signed our names to this specification in the presence of two subscribing witnesses.

FRANK WESLEY DICK.
  JAMES RILEY.

Witnesses:
  ARCHIBALD McLELLAN,
  DAVID FERGUSON.